United States Patent Office 2,759,932
Patented Aug. 21, 1956

---

2,759,932

SERIES OF NEW N-(5-NITRO-2-FURFURYLIDENE)-3-AMINO-2-IMINOOXAZOLIDINES

Frank F. Ebetino, Somerville, N. J., and Gabriel Gever, Oxford, and Kenyon J. Hayes, Norwich, N. Y., assignors, by mesne assignments, to The Norwich Pharmacal Company, Norwich, N. Y., a corporation of New York No Drawing. Application August 10, 1953,
Serial No. 373,438

6 Claims. (Cl. 260—240)

This invention relates to a new series of chemical compounds. The series consists of a number of closely-related N-(5-nitro-2-furfurylidene)-3-amino-2-iminooxazolidines and the salts thereof. They are described by the general formula:

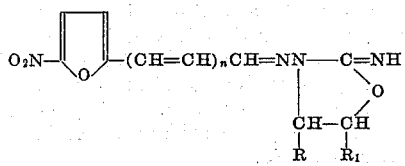

wherein
$n$ represents an integer from 0–1,
R is a member of the group consisting of hydrogen and lower alkyl, and
$R_1$ is a member of the group consisting of hydrogen and lower alkyl.

The salts of the compounds which are described by the general formula above can be readily and conveniently prepared by neutralization of the bases with acids such as hydrochloric, sulfuric and β-naphthalene sulfonic.

The new compounds of the series, while possessing anti-microbial properties, are particularly useful as intermediates for the preparation of members of a series of N - (5 - nitro - 2 - furyl) alkylidene - 3 - amino - 2-oxazolidones. The latter compounds, which form the subject matter of pending application Serial No. 274,066, filed February 28, 1952, and owned by the assignee of this application, upon which U. S. Patent No. 2,742,462 has issued possess a high order of in vivo chemotherapeutic effectiveness against microbial infections upon oral administration.

In order that our invention may be entirely available to those skilled in the art, methods for making a number of the new compounds of the series are described briefly and, in conjunction therewith, the utility of our new compounds in the preparation of a chemotherapeutically active N-(5-nitro-2-furyl)alkylidene-3-amino-2 - oxazolidone is pointed out:

EXAMPLE I

*N-(5-nitro-2-furfurylidene)-3-amino-2-iminooxazolidine*

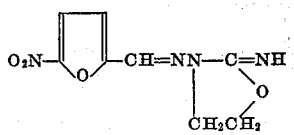

In a 22 liter, three-necked flask provided with a reflux condenser, stirrer and thermometer are placed 2.32 kg. of 5-nitro-2-furaldehyde 2-(2-hydroxyethyl)-semicarbazone and 7 liters of dry benzene. To the well stirred suspension is added a solution of 4.9 kg. of thionyl chloride in 5 liters of benzene, with heating and at such a rate as to maintain the temperature at 40–45° C. After the heavy gas evolution has abated, the suspension is heated at 55–65° C. for one hour. The mixture is cooled and the solid filtered with suction. The yield of N-(5-nitro-2-furfurylidene)-3-amino-2-iminooxazolidine hydrochloride is 2.40 kg. (96%). M. P. 190° C. This is converted to the free base by dissolving it in a minimum of water, clarifying and precipitating with a cold solution of 10% sodium carbonate. This can be further purified by recrystallization from ethyl alcohol, M. P. 170–171° C.

The free base, N-(5-nitro-2-furfurylidene)-3-amino-2-iminooxazolidine, dissolved in the minimum quantity of boiling methanol is treated with a slight excess of concentrated sulfuric acid. On cooling, the acid sulfate crystallizes, melting point 203° C. with decomposition. Similarly, treatment of the same free base in hot methanol with excess β-naphthalene sulfonic acid yields the neutral salt of melting point 222–224° C. with decomposition.

The N-(5-nitro-2-furfurylidene)-3 - amino - 2 - iminooxazolidine hydrochloride can be converted to the corresponding 2-oxazolidone by the action of cold nitrous acid or by heating with water or dilute acid. An example of the use of nitrous acid follows:

Technical N-(5-nitro - 2 - furfurylidene) - 3 - amino-2-iminooxazolidine hydrochloride (900 g.) is dissolved in 10 liters of warm water and filtered to remove a small amount of insoluble material. The solution is cooled to 5–7° C. in an ice bath and by addition of 5 kg. of chopped ice. Glacial acetic acid (1500 cc.) is then introduced. Sodium nitrite (3.40 kg.) is added with cooling and stirring during thirty minutes. Some foaming results and a yellow precipitate forms very rapidly. After four hours the solid is filtered with suction and dried to constant weight at 60° C. This crude product is purified by recrystallization from glacial acetic acid. The yield of N-(5-nitro-2-furfurylidene)-3-amino-2-oxazolidone is 442 g., (60%) of M. P. 253–256° C.

EXAMPLE II

*N-β-(5-nitro-2-furyl)acrylal-3-amino-2-iminooxazolidine*

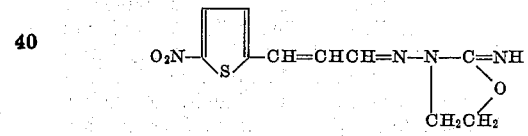

Forty-one and six-tenths grams of β-(5-nitro-2-furyl) acrolein 2-(2-hydroxyethyl)semicarbazone of M. P. 209–210° C. (prepared from 5-nitro-2-furylacrolein and 2-hydroxyethylsemicarbazide) is treated rapidly with 250 cc. of thionyl chloride in a large beaker. Gas is evolved and the red solid rapidly becomes yellow. After standing at room temperature for twelve hours the yellow solid is filtered and washed repeatedly with dry ether, yield 44.7 g. of N-(5-nitro-2-furyl)acrylal-3-amino-2-iminooxazolidine hydrochloride of M. P. 229° C. with decomposition. This hydrochloride is converted to the free base by dissolving it in cold water, clarifying, follwed by treatment with sodium carbonate solution to pH of about 9. The orange, voluminous precipitate of the free base is filtered, washed with water, well dried and recrystallized from absolute ethanol. It melts at 182° C. with resolidification on further heating. Yeld 32.3 g.

The crude N-(5-nitro-2-furyl)acrylal-3-amino-3-iminooxazolidine can be converted to the corresponding oxazolidone by heating with dilute acid.

Twenty-eight grams of N-(5-nitro-2-furyl)acrylal-3-amino-2-iminooxazolidine is dissolved in 1250 cc. of water containing 13 cc. of concentrated hydrochloric acid. The clarified solution is boiled for thirty minutes and the precipitated solid filtered from the hot solution. The filtrates are reboiled and refiltered after thirty minutes and the process repeated until no further solid forms. The crude product thus collected (23.2 g.) is a mixture of the 5-nitro-2-furylacrolein derivatives of 3-amino-2-oxazolidone and of 2-(2-hydroxyethyl)semicarbazide. These are separated by treatment with thionyl chloride in benzene which converts the hydroxyethyl semicarbazide derivative to the water soluble 3-amino-2-iminooxazolidine hydrochloride compound, which can be recycled. Four cycles of this process yield 20.2 g. of N-(5-nitro-2-furyl)acrylal-3-amino-2-oxazolidone. This can be purified by crystallization from nitromethane to give a yellow material of M. P. 270° C. dec.

EXAMPLE III

N-(5-nitro-2-furfurylidene)-3-amino-5-methyl-2-iminooxazolidine

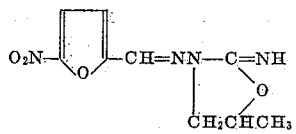

A solution of 2-(2-hydroxypropyl)semicarbazide is prepared by the treatment of 1-hydrazino-2-propanol with potassium cyanate. To this solution is added 5-nitro-2-furaldehyde to give 5-nitro-2-furaldehyde 2-(2-hydroxypropyl)semicarbazone M. P. 195–196° C.

Twenty grams of 5-nitro-2-furaldehyde 2-(2-hydroxypropyl)semicarbazone are added to 63.6 cc. of thionyl chloride while cooling in an ice bath. The temperature rises to 40° C. and gas is evolved. When the violent reaction has subsided, the mixture is allowed to stand at room temperature for forty-five minutes. The dark brown solution is then poured into 500 cc. of ether, which causes precipitation of gummy crystals of crude N-(5-nitro-2-furfurylidene)- 3-amino-5-methyl-2-iminooxazolidine hydrochloride. This is converted to the free base by dissolving it in a minimum of cold water, adding sodium carbonate solution until mildly alkaline, and removing by filtration the resulting precipitate. The dried precipitate is recrystallized from nitromethane, M. P. 170–173° C.

The crude N-(5-nitro-2-furfurylidene)-3-amino-5-methyl-2-iminooxazolidine hydrochloride is suitable for conversion to the oxazolidone. The yellow crystals are dissolved in 150 cc. of water, filtered free of any insoluble matter, 8.5 cc. of concentrated sulfuric acid is added and the solution refluxed for fifty minutes. A yellow solid gradually separates, which is filtered from the hot solution, washed with warm water and dried to constant weight at 100° to give 8.1 grams of N-(5-nitro-2-furfurylidene)-3-amino-5-methyl-2-oxazolidone of M. P. 248–252° C., yield 43%.

Recrystallization from glacial acetic acid raises the M. P. to 252–254° C.

EXAMPLE IV

N-(5-nitro-2-furfurylidene)-3-amino-5-n-butyl-2-iminooxazolidine hydrochloride

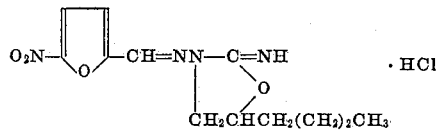

A solution of 2-(2-hydroxyhexyl)semicarbazide is prepared by the treatment of 1-hydrazino-2-hexanol with potassium cyanate. To this solution is added 5-nitro-2-furaldehyde to give 5-nitro-2-furaldehyde 2-(2-hydroxyhexyl)semicarbazone M. P. 131–132° C.

Ten grams of 5-nitro-2-furaldehyde 2-(2-hydroxyhexyl)semicarbazone are added to an excess of thionyl chloride. On adding ether to the solution a precipitate is obtained, yield 5 g. This is dissolved in absolute alcohol containing 10% ether, charcoaled and reprecipitated with absolute ether, M. P. 139–140° C.

Heating N-(5-nitro-2-furfurylidene)-3-amino-5-n-butyl-2-iminooxazolidine hydrochloride in water converts it to N-(5-nitro-2-furfurylidene)-3-amino-5-n-butyl-2-oxazolidone, M. P. 194° C.

EXAMPLE V

N-(5-nitro-2-furfurylidene)-3-amino-4-methyl-2-iminooxazolidine hydrochloride

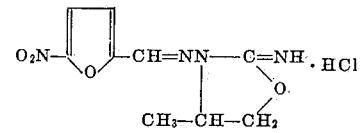

A solution of 2-(1-methyl-2-hydroxyethyl)semicarbazide is prepared by the treatment of 2-hydrazino-1-propanol with potassium cyanate. To this solution is added 5-nitro-2-furaldehyde to give 5-nitro-2-furaldehyde 2-(1-methyl-2-hydroxyethyl)semicarbazone, M. P. 204–205° C.

To 0.6 g. of 5-nitro-2-furaldehyde 2-(1-methyl-2-hydroxyethyl)semicarbazone is added 5 cc. of thionyl chloride. Gas evolution takes place and the color of the solid changes to very light yellow. The N-(5-nitro-2-furfurylidene)-3-amino-4-methyl-2-iminooxazolidine hydrochloride thus obtained weighs 0.60 g., 94%, M. P. 202–203° C. When a solution of 0.5 g. of this compound in 10 cc. of water is refluxed for one hour, a yellow solid is precipitated. This solid, N-(5-nitro-2-furfurylidene)-3-amino-4-methyl-2-oxazolidone, M. P. 199–200° C., weighs 0.25 g., 58%.

What is claimed is:

1. A member of the group consisting of a compound represented by the formula:

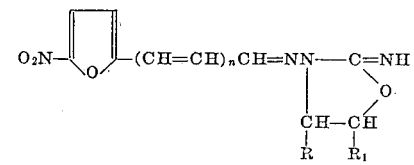

wherein:

n represents an integer from 0–1,

R is a member of the group consisting of hydrogen and lower alkyl, and $R_1$ is a member of the group consisting of hydrogen and lower alkyl;

and acid addition salts thereof.

2. N-(5-nitro-2-furfurylidene)-3-amino-2-iminooxazolidine represented by the formula:

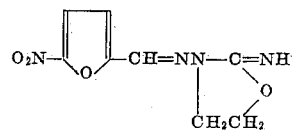

3. N-β-(5-nitro-2-furyl)acrylal-3-amino-2-iminooxazolidine represented by the formula:

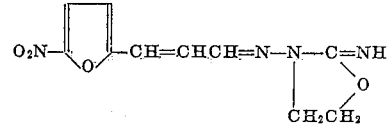

4. N-(5-nitro-2-furfurylidene)-3-amino-5-methyl-2-iminooxazolidine represented by the formula:

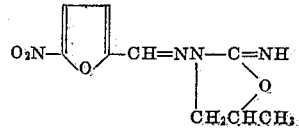

5. N - (5 - nitro - 2 - furfurylidene) - 3 - amino - 5 - n-butyl-2-iminooxazolidine hydrochloride represented by the formula:
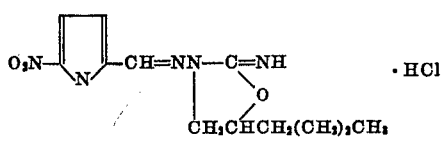
6. N - (5 - nitro - 2 - furfurylidene) - 3 - amino - 4-methyl-2-iminooxazolidine hydrochloride represented by the formula:
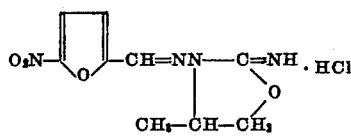
No references cited.